Feb. 4, 1958 H. J. SADLER ET AL 2,822,121
FLUID-PRESSURE-OPERATED FLUID INJECTOR
Filed Dec. 1, 1954
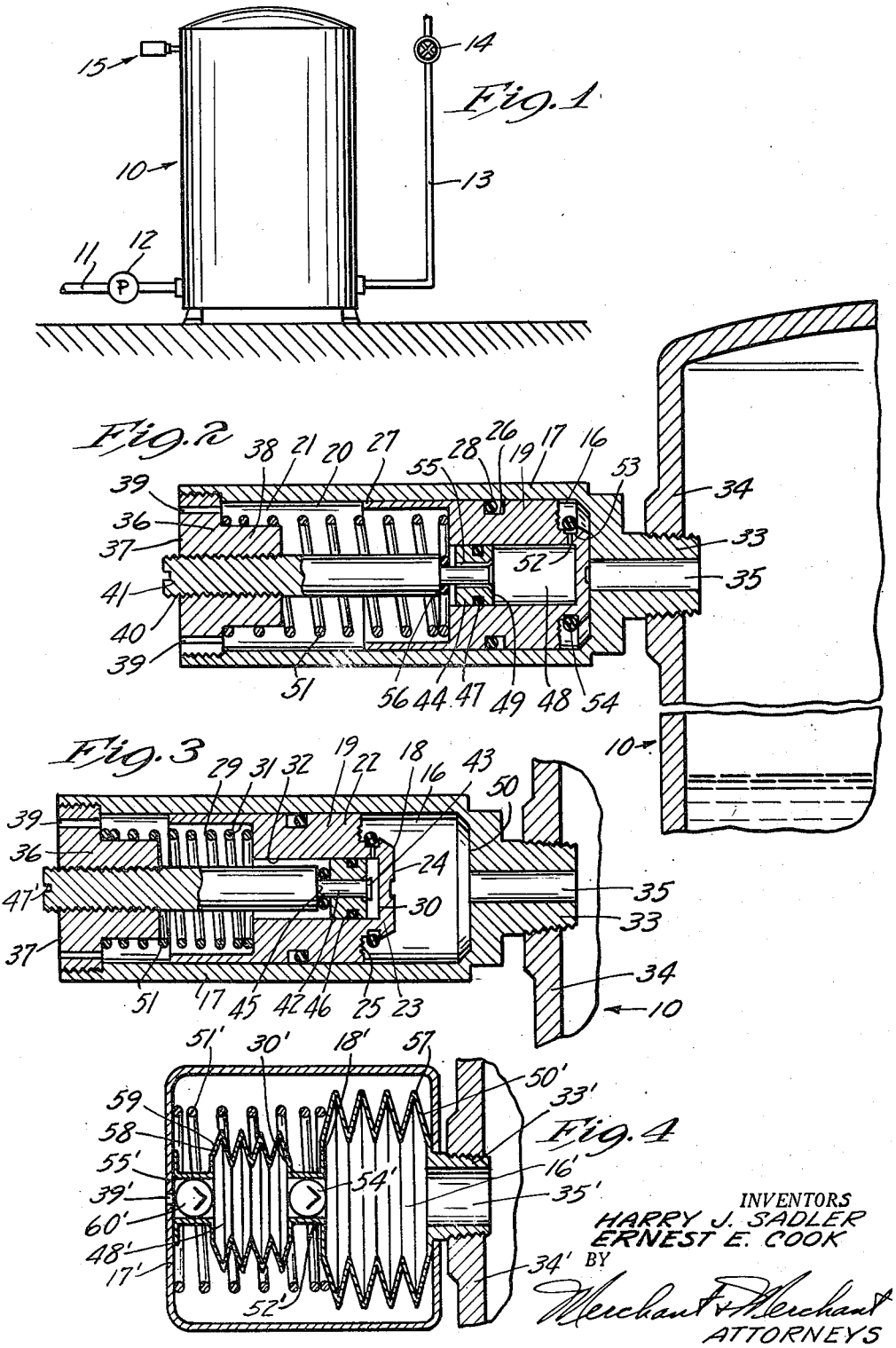
INVENTORS
HARRY J. SADLER
ERNEST E. COOK

2,822,121

FLUID-PRESSURE-OPERATED FLUID INJECTOR

Harry J. Sadler and Ernest E. Cook, Minneapolis, Minn.

Application December 1, 1954, Serial No. 472,296

4 Claims. (Cl. 230—20)

Our invention pertains to improvements in a fluid-pressure-operated fluid injector. In particular, it pertains to a fluid-pressure-operated fluid injector for maintaining a predetermined air volume under a given pressure at the top of the supply tank of a water supply system by controllably replenishing the air within said supply tank.

The conventional domestic water supply system provides a pump for drawing the water from a well or other source into a supply tank from which it is withdrawn for use. A quantity of air is retained at the top of the supply tank above the level of the water therein to maintain the water under a pressure greater than atmospheric. The pump is generally responsive to pressure variations in the supply tank. Generally, in the usual household water supply system, the pump will operate to fill the supply tank until the quantity of air is compressed to a pressure of approximately 40 pounds per square inch at which point the pump will cease to operate; as water is withdrawn, the pressure within the tank will drop to a predetermined minimum, usually 20 pounds per square inch, at which point the pump will again become operative to fill the supply tank to the maximum predetermined pressure of 40 pounds per square inch. The volume of water withdrawn during a pressure drop within the supply tank from 40 pounds per square inch to 20 pounds per square inch is dependent upon the volume of air at the top of the tank. As the volume of air decreases for any given pressure within the tank, the frequency of pump operation increases; and therefore it is desirable to maintain a constant volume of air at the top of the tank. To accomplish this, it is necessary to periodically replenish the air at the top of the supply tank as it is continuously being diminished through absorption in the water. Our invention is particularly adaptable for replenishing the air at the top of the supply tank because it is responsive to the pressure within the tank and periodically injects a controlled amount of air from atmosphere into the supply tank.

It is an object of our invention to provide a novel and improved fluid-pressure-operated fluid injector which is particularly adaptable for use in a water supply system to replenish a determinable quantity of air into the water supply tank thereof during each cycle of pressure variation in the tank.

It is another object of our invention to provide a novel and improved fluid-pressure-operated fluid injector which is easily manufactured and simply and effectively operative.

These and other objects will be disclosed in the course of the following specification and claims, reference being had to the accompanying drawings wherein:

Fig. 1 is a view in side elevation showing our invention attached to the supply tank of a domestic water supply system;

Fig. 2 is an enlarged view in vertical cross section showing in detail one modification of our invention at one operative position thereof;

Fig. 3 is a view similar to and of the modification of Fig. 2 but showing a second operative position thereof; and Fig. 4 is an enlarged view of a second modification of our invention having the two check valves thereof indicated symbolically.

Referring in particular to Fig. 1, reference numeral 10 indicates a supply tank of the ordinary domestic water supply system; numeral 11 indicates a pipe to a source of water pumped to the supply tank 10 by pump 12, indicated symbolically; and numeral 13 indicates an outlet pipe having a manual cutoff valve 14. Pump 12 is adapted to be controlled by means, not shown in the drawings, whereby it becomes operative at a predetermined minimum pressure within the supply tank 10 until a predetermined maximum pressure is reached in tank 10; at which point, pump 12 becomes inoperative until the pressure within supply tank 10 again drops to the predetermined minimum pressure. Generally, in the ordinary household water supply system, the operative limits of the pump 12 are at a minimum pressure of 20 pounds per square inch and a maximum pressure of 40 pounds per square inch. Our novel and improved fluid-pressure-operated fluid injector is indicated by the general reference numeral 15 and is attached to the supply tank 10 to be operated by the pressure variations from a predetermined minimum to a predetermined maximum therein.

Referring in particular to the modification shown in Figs. 2 and 3, fluid injector 15 has structure defining a primary expandable and contractible pressure chamber 16, which is defined by a tubular casing 17 and a piston-acting surface 18 carried by a member 19. Chamber 16 is a portion of a cylindrical space 20 within the casing 17; the remaining portion of space 20 is indicated by the numeral 21.

Member 19 is a cylindrical piston-acting member mounted in space 20 for longitudinal movement in opposite directions responsive to the variations of pressure within the supply tank 10; and it comprises an enlarged body portion 22 and a reduced end portion 23 having an end face 24. Piston-acting surface 18 is defined by end face 24 and an annular shoulder 25 between body portion 22 and end portion 23. Body portion 22 of member 19 is provided with an annular channel 26 intermediate shoulder 25 and its opposite end, indicated by the numeral 27; and positioned therein, is an O-ring 28. Member 19 has a longitudinally disposed cylindrical bore 29 extending from an end wall 30, adjacent end face 24, through the end 27 of body portion 22 and opening into space 21. Bore 29 comprises an enlarged cylindrical portion 31, and a reduced cylindrical portion 32.

Casing 17 has a reduced nozzle-shaped end 33 which is threaded to adapt it to be screwed into the side wall 34 of the tank 10. Preferably, end 33 is screwed into the side wall 34 above the maximum level of the water therein; however, valve 15 will be operative, as subsequently described, in substantially the same manner if end 33 is screwed into the side wall 34 below the maximum water level within tank 10. Extending longitudinally through end 33 of casing 17 is a central cylindrical bore 35 which communicates pressure chamber 16 with the interior of the supply tank 10. Opposite end 33, casing 17 is adapted to receive an enlarged threaded end 36 of a cap member 37, which has a reduced cylindrical portion 38 extending into space 21 in coaxial alignment with bore 29. Cap member 37 has apertures 39 extending through the enlarged end 36 thereof to communicate space 21 with a source of fluid to be injected into supply tank 10, which preferably herein is atmosphere, and has a tapped central bore 40 adapted to receive an adjustable plunger 41. Plunger 41 is in coaxial alignment with bore 29 and comprises a cylindrical rod having a reduced end portion 42 terminating in a beveled flange 43. An enlarged piston portion 44 is loosely carried on end portion 42 for limited relative longitudinal movement between flange 43 and a shoulder 45 adjacent the commencement of reduced end portion 42. Piston portion 44 has a channel 46 intermediate its ends in which is positioned an O-ring 47, and piston portion 44 is fitted within reduced portion 32 of bore 29 for relative longitudinal movement in opposite directions. Plunger 41, opposite reduced end portion 42, is provided with a notch 47 in which may be inserted a screw driver to move plunger 41 longitudinally in opposite directions in the cap member 37. This longitudinal adjustment of plunger 41 determines its stroke within cylindrical bore 29, for a purpose subsequently described.

Piston portion 44 of plunger 41 and reduced portion 32 of bore 29 define a secondary expandable and contractible pressure chamber 48. An end face 49 of piston portion 44 together with flange 43 and end wall 30 define relatively movable opposite end wall portions of the chamber 48; wherein end wall 30 carried by the piston-acting member 19 is movable toward and away from end face 49, which is relatively fixed. Piston-acting surface 18 and an inner surface 50 of the casing 17 at one end of the space 20 define opposite end wall portions of the chamber 16, wherein piston-acting surface 18 is movable toward and away from the fixed surface 50. Surface 18 is also connected to end wall 30 and the longitudinal movement of member 19 in a direction to expand the chamber 16 acts to contract the chamber 48.

Yielding means 51 biases member 19 in a direction to contract the primary chamber 16 and expand the secondary chamber 48, and preferably, as shown, comprises a spiral spring extending from the shoulder between the enlarged end 36 and the reduced portion 38 of cap member 37 to the shoulder between enlarged portion 31 and reduced portion 32 of bore 29. Yielding means 51 is adapted to bias member 19 against the surface 50, which is the maximum contracted position of primary chamber 16, at the minimum predetermined pressure within the tank 10.

A check valve equipped passage 52 is adapted to connect secondary chamber 48 with the supply tank 10; and, in the preferred embodiment herein disclosed, this communication is effected through the primary chamber 16 and bore 35. Preferably, passage 52 extends radially outwardly from the reduced portion 32 of bore 29, adjacent end wall 30, to the bottom of a channel 53, which extends circumferentially about the outer surface of reduced end portion 23 of member 19. Channel 53 is adapted to receive an O-ring 54 which acts as a check valve allowing fluid flow through passage 52 only in the direction of the primary chamber 16. O-ring 54 when unseated is rolled toward shoulder 25, which is provided with a rough face. The rough face of shoulder 25 prevents O-ring 54 from seating thereon, and insures that it will properly seat over the channel 53.

At the predetermined minimum pressure within supply tank 10, primary chamber 16 is at its maximum contracted position, shown in Fig. 2; and secondary chamber 48 is at its maximum expanded position. At this position chamber 48 is adapted to be in communication with the source of fluid to be injected into supply tank 10, which is atmospheric air, through a passage comprising a space 55 between the reduced end 42 and piston portion 44 of plunger 41. An increase of pressure within the supply tank 10 from its predetermined minimum to its predetermined maximum moves member 19 to expand primary chamber 16 and to contract secondary chamber 48; and as shown in the drawings, member 19 moves from the position shown in Fig. 2 toward the position shown in Fig. 3. Valve means are provided so that, upon the expansion of primary chamber 16 and the contraction of secondary chamber 48, a quantity of air from atmosphere is trapped within the chamber 48. The particular passage, which in the embodiment herein disclosed comprises space 55, and the afore-mentioned valve means might be formed in many ways; for example, the passage might extend from the shoulder between enlarged portion 31 and reduced bore 32 of bore 29 to a port opening at the cylindrical surface defining bore 32 and the valving of this passage could be accomplished by the relative movement of piston portion 44 of plunger 41 past the afore-mentioned port opening. Another manner of providing the passage between secondary chamber 48 and atmosphere and the valve means associated therewith would be to position piston portion 44 out of reduced bore 32 at the minimum predetermined pressure within tank 10, whereby the movement of member 19 upon the increase of pressure within tank 10 would move piston portion 44 into reduced bore 32 to trap a quantity of air at atmosphere therein. However, preferably as shown, the passage between chamber 48 and atmosphere comprises space 55 and the valve means associated therewith comprises an O-ring 56, mounted on reduced end 42 adjacent shoulder 45, and piston portion 44 which is movable on end portion 42 to seat against O-ring 56 when member 19 moves from the position shown in Fig. 2 upon the increase of pressure within supply tank 10.

The contraction of chamber 48 upon the movement of member 19 from the position shown in Fig. 2 increases the pressure of the fluid trapped therein; and the relationship of the area of piston surface 18 to the area of end wall 30 is such that the distribution of a pressure, greater than the predetermined minimum but not exceeding the predetermined maximum pressure within the supply tank 10, over the piston surface 18 is sufficient to increase the pressure within the secondary chamber 48 over the pressure in the primary chamber 16 to open check valve 53. At this point, the highly compressed fluid within secondary chamber 48 is ejected into the primary chamber 16; and member 19 is moved so that end wall 30 is adjacent flange 43. This position, which is the maximum contracted position of secondary chamber 48 and the maximum expanded position of primary chamber 16, is maintained until the pressure within supply tank 10 is decreased from its predetermined maximum by the withdrawal of water from the supply tank 10 through pipe 13. Member 19 during the decrease of pressure within supply tank 10 is moved by the bias of yielding means 51 back to the position shown in Fig. 2 at the minimum predetermined pressure within the supply tank 10. Air at atmosphere is able to pass through apertures 39 into space 21 and through space 55 into the evacuated secondary chamber 48 to prepare fluid injector 15 for another cycle of operation. Thus, it is clear that during the pumping period of the operating cycle of the water supply system the volume of air within the supply tank 10 will receive an amount of air from atmosphere to replenish the air lost by absorption in the water during each cycle of operation. The amount of air replenished during each cycle of operation is controlled by the longitudinal adjustment of plunger 41 which adjusts the stroke of plunger portion 44 within the reduced bore 32; and thereby controls the maximum expanded position of secondary chamber 48 which determines the volume of air ejected into supply tank 10 during each operating cycle.

Referring to the modification shown in Fig. 4, it demonstrates the adaptation of the principle of our invention whereby the structure defining the primary and secondary expandable and contractible chambers instead of being a piston and cylinder comprises bellows. As many of the elements of the modification shown in Fig. 4 are the same as or equivalent to the modification shown in Figs. 2 and 3, they will be indicated by the same numeral, but to avoid any confusion will be distinguished by a prime mark. The primary expandable and contractible chamber 16' is defined by a bellows 57 having one end wall 50' secured to a reduced end portion 33' of a casing 17'. Reduced end portion 33' of casing 17' is adapted to be screwed into the side wall 34' of the supply tank 10, and has a central bore 35' which communicates primary chamber 16' with the supply tank 10. Bellows 57 has a movable end wall 18' connected to a movable end wall 30' of a bellows 58 which defines a secondary chamber 48'. A check valve-equipped passage 52' connects secondary chamber 48' with primary chamber 16'; and the check valve 54', shown symbolically, allows flow through passage 52' only in the direction of primary chamber 16'. Bellows 58 has a fixed end wall 59, which, in the modification shown in Figs. 2 and 3, is defined by face 49 and flange 43, which is secured to the casing 17'. Casing 17' is provided at one end thereof adjacent end wall 59 of bellows 58 with an aperture 39' which extends to a passage 55' to communicate secondary chamber 48' with atmospheric air. Passage 55' is provided with a check valve 60, equivalent to the valve means consisting of O-ring 56 and movable piston portion 44 in the modification of Figs. 2 and 3, to allow flow therethrough only in the direction of the secondary chamber 48'. Yielding means 51' extending between casing 17' and movable end wall 18' of bellows 57 biases the movable end walls 18' and 30' in a direction tending to contract the primary chamber 16' and expand the secondary chamber 48'. The operation of the modification shown in Fig. 4 will be the same as explained in respect to the modification shown in Figs. 2 and 3. Yielding means 51' biases primary chamber 16' to its maximum contracted position at the minimum predetermined pressure within supply tank 10. The increase of pressure within the supply tank 10 from the predetermined minimum to the predetermined maximum expands the bellows 57 and contracts the bellows 58 to increase the pressure of the fluid trapped within the secondary chamber 48', which is atmospheric air admitted through passage 55' past check valve 60. The relationship of the area of end wall 18' of bellows 57 to the area of end wall 30' of bellows 58 is such that the distribution of a pressure greater than the minimum but not exceeding the maximum predetermined pressure within the supply tank 10 is sufficient to increase the pressure within the secondary chamber 48' over the pressure in the primary chamber 16' to open the check valve 52'. Thus, as explained with respect to the modification shown in Figs. 2 and 3, the supply tank 10 will receive an amount of air from atmosphere periodically during the pumping period of the operating cycle of the water supply system.

It will be obvious to those skilled in the art that our invention may be modified by many substitutions and equivalents and that this disclosure is intended to be illustrative only. Therefore, we intend to be limited solely by the scope of the appended claims.

What we claim is:

1. A fluid pressure operated fluid injector adapted for connection to the supply tank of a water supply system, the pressure within said tank being variable between predetermined maximum and minimum values, comprising a casing adapted for connection to said supply tank, a piston-acting member positioned within said casing for longitudinal movement in opposite directions responsive to variations of pressure within said supply tank and defining with said casing a primary expendable and contractible pressure chamber in communication with said supply tank, said member having a cylindrical bore longitudinally extending through one end thereof, a check valve equipped passage between the closed end of said bore and said primary chamber, said check valve allowing communication between said bore and said primary chamber only in the direction of the primary chamber, a plunger secured to said casing and positioned in coaxial relationship with said cylindrical bore for relative longitudinal movement in opposite directions therein and defining therewith a secondary expandable and contractible chamber, yielding means biasing said member in a direction tending to contract the primary chamber and expand the secondary chamber, a passage between said bore and atmosphere, and valve means normally allowing flow through said last-mentioned passage only in the direction of said bore, the relation of the cross sectional area of said bore and the surface area of said member over which the pressure within said supply tank is distributed being such that the distribution of a pressure greater than the minimum but not exceeding the maximum pressure within said supply tank is sufficient to contract the secondary chamber against the bias of said yielding means and the pressure within the secondary chamber to increase the pressure within the secondary chamber over the pressure in the primary chamber to operate the check valve between said bore and the primary chamber.

2. The structure defined in claim 1 wherein said check valve-equipped passage between said bore and said primary chamber comprises a passage radially extending from the cylindrical bore to the outer surface of said member, and said check valve comprises an elastic O-ring circumferentially channeled over the outer surface extremity of said passage.

3. The structure defined in claim 1 wherein said plunger is adjustably secured to said casing whereby the stroke of said plunger within said cylindrical bore may be adjusted to determine the amount of fluid replenished within said supply tank during each cycle of pressure variation therein.

4. The structure defined in claim 1 wherein said plunger comprises a cylindrical rod adjustably secured to said casing and having a reduced end portion terminating in a beveled flange, an enlarged piston portion loosely carried on said end portion for limited relative longitudinal movement between said flange and the shoulder adjacent the commencement of said reduced end portion, said piston portion fitted within said bore for relative longitudinal movement in opposite directions therein and the stroke thereof dependent upon the adjustment of said plunger, the passage between said bore and atmosphere comprises an annular space between said reduced end portion and said piston portion, and said valve means controlling the flow through said last-mentioned passage comprises an O-ring mounted on said reduced end portion adjacent said shoulder and said piston portion being movable on said end portion to seat against said O-ring.

References Cited in the file of this patent

UNITED STATES PATENTS

| | | |
|---|---|---|
| 862,867 | Eggleston | Aug. 6, 1907 |
| 2,126,880 | Gardner | Aug. 16, 1938 |
| 2,450,291 | McCarthy | Sept. 28, 1948 |
| 2,486,617 | Soberg | Nov. 1, 1949 |
| 2,614,498 | Piccardo | Oct. 21, 1952 |
| 2,650,606 | Amidon | Sept. 1, 1953 |
| 2,652,973 | Dibble et al. | Sept. 22, 1953 |

FOREIGN PATENTS

| | | |
|---|---|---|
| 600,260 | France | Feb. 3, 1936 |